United States Patent [19]

Wilkus et al.

[11] Patent Number: 4,857,673

[45] Date of Patent: Aug. 15, 1989

[54] POLYOLEFIN COMPOUNDS HAVING IMPROVED THERMAL STABILITY AND ELECTRICAL CONDUCTORS COATED THEREWITH

[75] Inventors: Edward V. Wilkus, Trumbull; Ida Fridland, Huntington; Joseph E. Betts, Westport, all of Conn.

[73] Assignee: Vulkor Incorporated, Lowell, Mass.

[21] Appl. No.: 840,979

[22] Filed: Mar. 13, 1986

Related U.S. Application Data

[63] Continuation of Ser. No. 590,603, Mar. 19, 1984, abandoned.

[51] Int. Cl.$^4$ .................................................. C08K 5/34
[52] U.S. Cl. .............................. 174/110 PM; 524/94; 524/412; 428/461
[58] Field of Search ................. 524/410, 411, 412, 94; 428/461; 174/110 R, 110 PM

[56] References Cited

U.S. PATENT DOCUMENTS

| | | | |
|---|---|---|---|
| 2,888,424 | 5/1959 | Precopio et al. | 524/586 |
| 2,962,464 | 11/1960 | Feild | 524/586 |
| 3,397,168 | 8/1968 | Kramer et al. | 524/607 |
| 3,418,263 | 12/1968 | Hindersinn et al. | 524/178 |
| 3,640,949 | 2/1972 | Dalzell | 524/412 |
| 3,677,942 | 7/1972 | Feiner et al. | 524/144 |
| 3,821,141 | 6/1974 | Mathis | 524/339 |
| 3,833,535 | 9/1974 | Wambach | 524/605 |
| 4,125,509 | 11/1978 | Vostovich | 524/437 |
| 4,260,661 | 4/1981 | Walters et al. | 524/583 |
| 4,374,220 | 2/1983 | Sonnenberg | 524/94 |
| 4,401,783 | 8/1983 | Kotian | 524/412 |
| 4,497,925 | 2/1985 | Abolins et al. | 524/269 |

FOREIGN PATENT DOCUMENTS 52-76355 6/1977 Japan .

*Primary Examiner*—Veronica P. Hoke
*Attorney, Agent, or Firm*—Hedman, Gibson, Costigan & Hoare

[57] ABSTRACT

A composition suitable as an electrical conductor insulation is provided which is composed of an ethylene-containing polymer, a halogenated flame retardant, an antimony compound, a lead compound, a peroxide curing agent and optionally a phenolic antioxidant and a zinc salt.

19 Claims, No Drawings

POLYOLEFIN COMPOUNDS HAVING IMPROVED THERMAL STABILITY AND ELECTRICAL CONDUCTORS COATED THEREWITH

This application is a continuation of Ser. No. 590,603 filed Mar. 19, 1984, now abandoned.

BACKGROUND OF THE INVENTION

Polyolefin polymers have been used as components of curable insulation compositions that are extruded onto electrical conductors and cured by heat. The prior art has recognized the desirability of adding stabilizers and flame retardants to polyolefin compositions to prevent thermal degradation of the base polymer and to avoid introducing flammable insulating materials into commercial or domestic environments. For example, to be economical and practical, polyolefin insulation systems used for electrical conductors such as building wire, electric motor wire, home appliance wire, underground power transmitting cables should be durable and retain their initial physical properties.

It is well known that the normal operating temperatures encountered in the environments that electrical devices are used are sufficiently elevated that oxidative degradation can be expected to occur. This phenomenon is commonly called "thermal aging".

The use of flame retardant agents to impart flame retardant properties to polyolefins is also well known in the art. It is also known that the addition of flame retardants can adversely affect thermal stability. The debilitating oxidative deterioration of polymeric compositions, such as physical embrittlement and cracking, is a subject of vast and intensive concern and has been the subject of substantial research activity. For example, U.S. Pat. Nos. 3,819,410 and 3,879,180 are concerned with the problem of polymer oxidation and provide a number of proposed solutions. U.S. Pat. No. 4,260,661, which is incorporated by reference describes the use of a sterically hindered di-tertiary butyl phenol with at least one zinc salt of a mercaptoimidazole selected from the group consisting of a zinc salt of 2-mercaptobenzimidazole or a zinc salt of 2-mercaptotolylimidazole.

SUMMARY OF THE INVENTION

The invention provides a curable, flame retardant insulating composition which comprises:
(a) an ethylene containing polymer;
(b) a halogenated flame retardant;
(c) an antimony compound;
(d) an amount of a lead compound that is effected to enhance the flame retardant and the antimony compound; and
(e) a peroxide curing agent.

The present invention provides a novel insulation composition which comprises:

| | | parts by weight |
|---|---|---|
| (a) | a polyolefin resin; | 100 |
| (b) | a halogenated flame retardant; | 5–50 |
| (c) | an antimony compound; | 1–25 |
| (d) | a lead compound; | 0.25–2.5 |
| (e) | a sterically hindered phenol; | 0.5–10 |
| (f) | dimethylpolysiloxane gum; | 0–7.5 |
| (g) | at least one zinc salt of a mercaptoimidazole selected from 2-mercaptobenzimidazole; or 2-mercaptotolylimidazole; or mixtures thereof. | 1–20 |
| (h) | fumed collcidal silica; and | 0–10 |
| (i) | a peroxide cross-linking agent. | 0–6 |

The relative proportions of the composition other than the polyolefin are described in terms of parts by weight per 100 parts by weight of the polyolefin resin. These compositions have high thermal oxidative resistance and high flame retardance.

OBJECTS OF THE INVENTION

This invention is concerned with providing polyolefin insulating compositions that have high thermal stability and enhanced flame retardant properties.

A further object of this invention is to provide polyolefin insulating compositions that have high thermal stability and have a flame retardant rating of VW-1 as determined y Underwriters Laboratory Flame Travel Test 758.

It is also an object of this invention to provide flame retardant polyolefin insulating compositions that have a thermal stability rating that exceeds 150° C.

It is also an object of this invention to provide flame retardant polyolefin insulating compositions that have a thermal stability rating that exceeds 150° C. and enhanced flame retardance before and after a period of thermal aging.

It is also an object of this invention to provide flame retardant polyolefin insulating compositions that have a thermal stability in excess of 150° C. and a flame retardant rating of VW-1 as determined by Underwriters Laboratory Flame Travel Test 758.

It is also an object of this invention to provide novel insulating electrical conductors having improved thermal and flame retardant properties.

It is also an object of this invention to provide a novel method of rendering a polyolefin insulating composition thermally stable and flame retardant.

BRIEF DESCRIPTION OF THE DRAWING

FIG. 1 is a perspective view of a conductor that is electrically insulated with a composition according to the present invention.

DETAILED DESCRIPTION OF THE INVENTION

The compositions of the invention comprise a curable or thermosettable polyolefin composition that is flame retardant and thermally stable and may be converted by the use of a peroxide and heat, radiation or electron beams to a thermoset condition.

The polyolefin resins include high and low density polyethylene, linear low density polyethylene, copolymers of ethylene and other polymerizable materials, and blends of polymers or copolymers of ethylene with other polymeric materials. Suitable copolymers of ethylene comprise ethylene-vinyl acetate, ethylene-propylene rubber and ethylene-propylene terpolymers (EPDM) and ethylene-acrylic copolymers. These polymers comprise a major component of ethylene. For example, an ethylene-propylene copolymer or terpolymer will contain at least about 50% by weight of ethylene and generally about 50 to 75% thereof. Copolymers of ethylene and vinyl acetate contain about 70 to 95% by weight of ethylene.

The ethylene-containing polymers may also be blended with chlorine containing polymers such as chlorinated polyethylene, chlorosulfonated polyethylene or polyvinyl chloride. It should be understood that the use of halogenated polymers will reduce the total amount of auxiliary flame retardant additives required.

The halogenated flame retardant compounds that may be employed in the practice of the invention include the useful halogen-containing compounds of the formula:

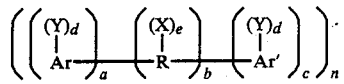

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine, a sulfur-containing linkage, e.g., sulfide, sulfoxide, sulfone, carbonate; a phosphorus-containing linkage; and the like. R can also consist of two or more alkylene or alkylidene linkages connected by such groups as aromatic, amino, imide, diimide, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art.

Ar and Ar' are mono- or polycarboxylic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are di-aromatics of which the following are representative:
2,2-bis-(3,5-dichlorophenyl)methane
bis-(2-chlorophenyl)methane
bis-(2,6-dibromophenyl)methane
1,1-bis-(4-iodophenyl)methane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis(-4-chlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-bichlorobiphenyl, 2,4'-dibromobiphenyl, 2,4'-dichlorobiphenyl, hexabromobiphenyl, octabromobiphenyl, decabromobiphenyl, halogenated diphenyl ethers containing 2 to 10 halogen atoms and ethylene-bis (tetrabromophthalimide).

The preferred halogenated flame retardant is ethylene-bis (tetrabromophthalimide).

The type of antimony compound is not critical and it may be organic or inorganic. For example organic compounds may use antimony esters, cyclic alkyl antimonites, aryl antimonic acids, and the like. Other compounds that may be used include KSb tartrate; Sb caproate, $Sb(OCH_2CH_3)_3$; Sb $(OCH(CH_3)CH_2CH_3)_3$; Sb polymethylene glycolate; triphenyl antimony and the like. Inorganic antimony compounds include antimony oxide, $Sb_4O_6$ or $Sb_2O_3$; $NH_4SbF_6$; $SbS_3$; antimony chloride, $SbCl_3$; antimony phosphate and the like. The preferred antimony compound is antimony oxide.

The lead compound may be an organic or inorganic compound. It may be a lead salt of an organic acid such as lead acetate; lead propionate, dibasic lead phthalate, and other liquid and solid organolead compounds. Inorganic lead compounds such as lead oxides, lead carbonates, lead sulfates, lead phosphates and the like may be employed. The preferred lead compound is dibasic lead phthalate.

The sterically hindered phenols for use in the practice of the invention are well known and many are commercially available.

The most preferred such compounds are of the formula:

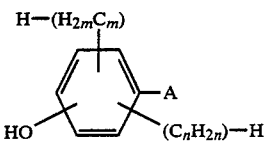

wherein m and n are 0 to 6 and A is

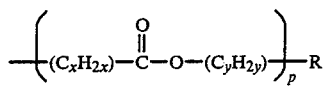

wherein p is from 1 to 6, x is from 0 to 6, y is from 0 to 30 and R is hydrogen, a tetravalent carbon radical or a mono- to hexa-valent hydrocarbon radical of from 1 to 12 carbon atoms; or

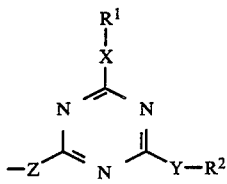

wherein ach of $R^1$ and $R^2$ is selected from $-(C_zH_{2z}S)_q-C_rH_{2r+1}$ or

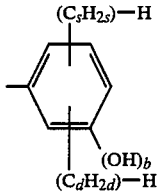

and each of X, Y and Z is selected from —O—, —S— or

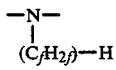

in which each of s and d is from 0 to 6, each of f and r is from 0 to 30, z is from 2 to 6, q is 0 to 3 and b is 0 or 1.

The preferred phenolic compounds thus include phenolic carboxylic acids, phenolic alkyl carboxylic acids, esters of such acids and phenolic substituted 1,3,5-triazine derivatives. The hydrocarbon substituents on the phenolic ring will be straight or branched chain of from one to six carbon atoms, such as methyl, ethyl, n-propyl, i-propyl, n-butyl, t-butyl, n-pentyl, 2,3-dimethylbutyl, n-hexyl and the like. Preferably, in the compounds of the above formula, the phenol group will be a dialkyl phenolic group in which at least one alkyl group is in a position ortho to the hydroxy group. The other alkyl group is either (a) in the other position ortho to the hydroxy group or (b) meta to the hydroxy group and para to the first alkyl group. Although not so limited, the alkyl groups substituted on the phenol ring are preferably branched groups such as t-butyl.

Within the family of phenolic compounds are preferred species, such as tetrakis-[methylene(3',5'-di-t-butyl-4'-hydroxy)-hydrocinnamate]methane; 2,4-bis-(octylthio)-1,3,5-triazine, each of which can be made by means known to those skilled in this art and which, respectively, are available from Ciba-Geigy Corp., Ardsley, N.Y., under product designations IRGANOX 1010, 1093 and 1035. Especially preferred is tetrakis (methylene 3-(3',5'-di-tert-butyl-4'-hydroxyphenyl)propionate)methane.

The zinc salt of a mercaptoimidazole component of the combination of this invention comprises a zinc salt of 2-mercaptobenzimidazole sold under the trade designation Vulkanox ZMB by Mobay Chemical, or a zinc salt of 2-mercaptotolylimidazole sold under the trade designation Vanox ZMTI by R. T. Vanderbilt or Vulkanox ZMB-2 by Mobay Chem.

Peroxide crosslink curing agents for the various curable compositions of this invention comprise the free radical forming organic peroxides such as tertiary peroxides characterized by at least one unit of the structure

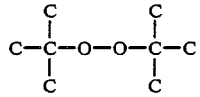

which is activated by its decomposition at temperatures in excess of about 295° F. the use of such peroxides in cross-linking polymers is described in detail in U.S. Pat. Nos. 2,888,424; 3,079,370; and 3,214,422. A commonly used and perferred curing agent for this invention is dicumyl peroxide. Other useful peroxide curing agents include the tertiary diperoxides such as 2,5-dimethyl-2,5-(t-butyl) peroxy)hexane, and 2,5-dimethyl-2,5-di(t-butyl-peroxy) hexyne-3, mixture of para and meta isomers of $\alpha,\alpha'$-bis (t-butyl peroxy) diisopropyl benzene (Vul-Cup-R), and the like diperoxy compounds.

The use of a peroxide curing coagent in the crosslinking of the novel composition of this invention is strongly preferred to increase the efficiency of the cure in accordance with the technology in this art. Apt curing coagents include, for example, trimethylol propane, trimethacrylate and other esters of metacrylic acid such as ethylene glycol dimethacrylate and 1,3-butyl glycol dimethylacrylate. Additional examples of coagents are set forth in an article entitled "Evaluation Of Crosslinking Coagents In Ethylene-Propylene Rubber" by Lenas, I&EC Produce Research & Development, Volume 2, No. 3, September, 1963, pages 202-208.

A high molecular weight polydimethylsiloxane gum may be added to the composition. These gums are commercially available in combination with silica reinforcing fillers. The composition may include colloidal silicas having a high surface area such as fumed silica, precipitated silica, silica aerogel and the like. These materials are well known and are commercially available as Cabosil M-S7 or H-S5.

The compositions of the invention may comprise the following components which are based on the ethylene polymer content being 100 parts by weight and each component being calculated as parts by weight per 100 parts of ethylene polymer.

| | |
|---|---|
| ethylene polymer | 100 |
| halogenated flame retardant | 10–35 |

-continued

| | |
|---|---|
| antimony compound | 1–25 |
| zinc salt of 2-mercaptobenzimidazole or 2-mercaptotolylimidazole | 1–20 |
| hindered phenol antioxidant | 0.5–12 |
| lead compound | 0.25–2.5 |
| dimethylpolysiloxane gum | 1–7.5 |
| fumed colloidal silica | 0.5–10 |
| peroxide | 1–5 |

The above relative proportions are given for guidance in the practice of the invention. It is understood that other components such as pigments, processing aids and the like may also be used in the compositions of the invention.

Without being bound by the theory of why the compositions of the invention have outstanding thermal and flame retardant properties, these results are believed to be achieved by the use of a minor amount of a lead compound in combination with the antimony compound as well as the other stabilizers. The applicants have observed that an antimony compound, i.e. antimony oxide in the presence of hot carbon char, which is primarilly carbon, will be reduced to elemental antimony metal that takes the form of exfoliating, fragile tree like branches. When a minor amount of a lead compound, such as di-basic lead phthalate, is combined with antimony oxide, and hot carbon char, the antimony is reduced with the lead compound and apparently forms a lead-antimony alloy that can be visualized as a cohesive continuum of metal that is believed to enhance the flame retardant test performance of compositions that contain these materials. Based on empirical data, it is believed that the use of high amounts of lead will adversely affect heat age resistance. For this reason only an amount of a lead compound should be used which is effective to enhance the flame retardant qualities of polymeric compositions which contain a halogenated flame retardant and an antimony compound. While the primary object of the present invention is to render ethylenic polymer compositions both flame retardant and thermally stable, it is also contemplated that the novel flame retardant system can be utilized in various organic polymers such as thermoplastics which include polystyrenes, polyesters, polycarbonates, polyphenylene oxides, polysulfones, polyacetals, polypropylene, polyamides and the like. These materials and other useful thermoplastics are described in the Modern Plastics Encyclopedia 1982–83 which is incorporated by reference.

The components of the composition of the invention may be mixed using any conventional compounding method or apparatus such as a Banbury mixer of a two roll rubber mill. All of the materials may be combined and mixed except if a heat decomposable peroxide curing agent is added, it should be added separately while controlling the heat. A method of curing the composition is described in U.S. Pat. No. 4,260,661 which is incorporated by reference.

DESCRIPTION OF THE PREFERRED EMBODIMENTS

The following examples illustrate the invention. They are set forth as a further description, but are not to be construed as limiting the invention thereto.

EXAMPLE 1

A composition is prepared which includes the following materials:

| | PHR* |
|---|---|
| Ethylene vinyl acetate copolymer (9% vinyl acetate) | 100.0 |
| Ethylene-bis (tetrabromophthalimide) | 30.0 |
| Antimony oxide | 15.0 |
| Dibasic lead phthalate | 1.5 |
| Alumina trihydrate | 10.0 |
| Tetrakis(methylene-3(3',5'-di-tert-butyl-4'-hydroxyphenyl) propionate) methane (Irganox 1010) | 3.5 |
| Zinc salt of 2-mercaptotolylimidazole (Vanox ZMTI) | 7.0 |
| Dimethylpolysiloxane gum | 3.0 |
| Dicumyl peroxide (Dicup R) | 4.0 |

*parts per hundred parts of resin

All of the powder components except for the dicumyl peroxides are first placed in a Banbury mixer before the resin component is added. The composition is thoroughly mixed at an elevated temperature and transferred to a two roll rubber mill where they are milled and sheeted off in ¼" sheets. The dicumyl peroxide is added using a roll rubber mill with cooling to keep the batch temperature below about 190° F. and stripped from the mill into a pelletizer where it is cut into ¼"×¼" pellets. The pellets are then used in an extruder to coat tinned copper wire #20 AWG which is subsequently cured by exposure to steam at about 406° F. for about 1.25 minutes.

EXAMPLE 2

Using the general procedure of Example 1, the following composition was prepared and a 30 mil thick coating was applied and cured onto tinned copper wire:

| | PHR |
|---|---|
| Low density polyethylene (Exxon Chemical Co. LD-405.8) | 100 |
| Tetrabromodiphenyl ether | 30 |
| Antimony oxide | 15 |
| Zinc salt of 2-mercaptotolylimidazole tetrakis(methylene-3) 3',5'-di-tert-butyl-4'-hydroxyphenyl)propionate) methane (Irganox 1010) | 8 |
| | 4 |
| Dibasic lead phthalate | 1.5 |
| Dimethylpolysiloxane gum (high molecular weight silica) Reinforced gum CE 902 GE Co.) | 5 |
| Fumed colloidal silica (Cabosil MS-7) | 5 |
| Peroxide (para and meta isomers of α,α'-bis (t-butyl peroxy) diisopropyl benzene) (Vulcup-R) | |

The coated wire was tested for thermal stability flame retardant properties and the results are reported in Table 1.

EXAMPLE 3

Using the general procedure of Example 1, the following composition was prepared and a 30 mil thick coating was cured onto tinned copper wire:

|  | PHR |
|---|---|
| Low density polyethylene (Exxon Chemical Co. LD-405.8) | 100 |
| Ethylene-bis (tetrabromophthalimide) | 30 |
| Antimony oxide | 15 |
| Zinc salt of 2-mercaptotolylimidazole | 8 |
| tetrakis (methylene-3(3',5'-di-tert-butyl-4'-hydroxyphenyl)propionate methane | 4 |
| Dibasic lead phthalate | 4 |
| Dimethylpolysiloxane gum (high molecular weight silica reinforced gum CE 902 GE Co.) | 1.5 |
| Fumed colloidal silica (Cabosil MS-7) | 5 |
| Trimethylolpropane methacrylate (Sartomer Resin-SR 350) | 5 |
| Peroxide (para and meta isomers of α, α'-bis-t-butylperoxy)-diisopropyl benzene (Vulcup-R) | 1 |
|  | 3 |

The coated wire was tested for thermal stability and flame retardant properties and the results are reported in Table 1.

EXAMPLES 4 AND 5

Using the general procedure of Example 1, the following compositions were prepared and a 30 mil coating was cured onto tinned copper wire:

|  | PHR |
|---|---|
| Example 4 |  |
| Low density polyethylene (USI-NA-300-00) and low molecular weight polyethylene (microfine powder) MFI 22 (FN-500) (US Industries) (90:10 wt. ratio) | 100 |
| Ethylene bis (tetrabromophthalimide) | 30 |
| Antimony oxide | 15 |
| Di-basic lead phthalate | 1.5 |
| Fumed colloidal silica (Cabosil MS-7) | 5 |
| Tetrakis (methylene-3(3',5'-di-tert-butyl-4'-hydroxyphenyl)propionate) (Irganox 1010) | 4 |
| Zinc salt of 2-mercaptotolylimidazole | 8 |
| Dimethylpolysiloxane gum (high molecular weight silica reinforced gum CE 902 GE Co.) | 5 |
| Trimethylol propane trimethacrylate (Sartomer resin SR-350) | 1 |
| Peroxide (para and meta isomers of α,α'-bis-t-butyl peroxy)diisopropyl benzene) Vulcup-R | 3 |
| Example 5* |  |
| Ethylene vinylacetate copolymer | 100 |
| Condensation product of 2 moles of hexachlorocyclopentadiene and 1 mole of cyclooctadiene (Dechlorane Plus 25) | 35 |
| Antimony oxide | 17 |
| Tetrakis (methylene-3(3',5'-di-tert-butyl-4'-hydroxyphenyl) | |
| propionate) (Irganox 1010) | 2 |
| Zinc salt of 2-mercaptobenzimidazole | 4 |
| Zinc stearate | 2 |
| Dicumyl peroxide | 4 |

*Control

The coated wires were tested for thermal stability and flame retardant properties and the results are reported in Table 1.

CONTROL EXAMPLE A

Using the general procedure of Example 1, the following composition was prepared and a 30 mil coating was cured onto tinned copper wire.

|  | PHR |
|---|---|
| Low density polyethylene (USI-NA-300.00) and low molecular weight polyethylene (microfine powder) MFR 22 (FN-500) (US Industries) (90:10 wt. ratio) | 100 |
| Decabromodiphenyl ether | 30 |
| Antimony oxide | 15 |
| Di-basic lead phthalate | 5 |
| Fumed colloidal silica | 5 |
| Thiodiethylene-bis-(3',5'-di-tert-butyl-4-hydroxy) hydrocinnamate (Irganox 1035) | 3 |
| Zinc salt of 2-mercaptotolylimidazole | 3 |
| Dimethylpolysiloxane gum (high molecular weight silica Reinforced gum CE 902 GE Co.) | 5 |
| Dibasic lead stearate (predispersed at a concentration of 65% by weight on EPDM) DSE (DS207) D-65 Wyrough & Loser | 1 |
| Tri-allyl cyanurate | 1 |
| Peroxide (para and meta isomers of α, α'-bis-t-butyl peroxy)diisopropyl benzene) (Vulcup-R) | 3 |

The coated wire was tested for thermal stability and flame retardant properties and the results are reported in Table 1.

TABLE 1

The wire samples were thermally aged in an oven at 231° C. for 15 hours and 24 hours respectively. Thereafter they were tested according to UL 62 flexible cord and fixture wire VW-1 flame test using a 12" length of wire that is supported in the vertical position. The test sample is contacted with a bunsen burner flame for 15 seconds and withdrawn until the sample self-extinguishes or fifteen seconds after withdrawal whichever is later; the ignition sequence is repeated four additional times. A test failure is recorded by (a) the test sample does not self-extinguish in one minute; and (b) particles from the test sample fall on and ignite a bed of cotton below the wire; or (c) a "flag" mounted on top of the test sample burns.

TABLE 1

|  | Ignition No.* | | | | | Falling Particles | Ignite Cotton | Ignite Flag | UD to Flag** | Result |
|---|---|---|---|---|---|---|---|---|---|---|
|  | 1 | 2 | 3 | 4 | 5 | | | | | |
| Example 1 | 0 | 6 | 2 | 0 | 0 | no | no | no | 6.0 | pass |
| aged 15 h | 1 | 1 | 1 | 0 | 0 | no | no | no | 6.5 | pass |
| at 231° C. | 0 | 8 | 1 | 0 | 0 | no | no | no | 6.5 | pass |
| Example 2 | 23 | 25 | 0 | 0 | 0 | no | no | singed | 3.0 | barely pass |

TABLE 1-continued

|  | Ignition No.* | | | | | Falling Particles | Ignite Cotton | Ignite Flag | UD to Flag** | Result |
| --- | --- | --- | --- | --- | --- | --- | --- | --- | --- | --- |
|  | 1 | 2 | 3 | 4 | 5 | | | | | |
| aged 15 h at 231° C. | 22 | 13 | 0 | 0 | — | no | no | singed | 3.5 | barely pass |
|  | 22 | 45 | — | — | — | no | no | singed | — | fail |
| Example 2 | >60 | — | — | — | — | | Burned all the way | | | fail |
| aged 24 h at 231° C. | >60 | — | — | — | — | | Burned all the way | | | fail |
| Example 3 | 1 | 4 | 0 | 0 | — | no | no | no | 5½ | pass |
| aged 15 h | 1 | 5 | 0 | 0 | — | no | no | no | 5¾ | pass |
| at 231° C. | 0 | 3 | 0 | 0 | — | no | no | no | 6.0 | pass |
| Example 3 | 1 | 11 | 0 | 0 | — | no | no | no | 5½ | pass |
| aged 24 h | 1 | 28 | 0 | 0 | — | no | no | no | 3½ | pass |
| at 231° C. | 2 | 1 | 0 | 0 | — | few | no | no | 6.0 | pass |
| Example 4 | 0 | 30 | 6 | 2 | 0 | no | no | no | 5.0 | pass |
| aged 15 h | 0 | 25 | 0 | 0 | 0 | no | no | no | 5.5 | pass |
| at 231° C. | 0 | 33 | 2 | 0 | 0 | no | no | no | 4.5 | pass |
| Example 5*** | >60 | — | — | — | — | | Burned all the way | | | fail |
| aged 15 hr | >60 | — | — | — | — | | Burned all the way | | | fail |
| at 231° C. | >60 | — | — | — | — | | Burned all the way | | | fail |
| Control | >60 | — | — | — | — | | Burned all the way | | | fail |
| Example A | >60 | — | — | — | — | | Burned all the way | | | fail |
| aged 15 h at 231° C. | >60 | — | — | — | — | | Burned all the way | | | fail |

*time in seconds
**denotes unburned distance to flag (in inches)
***control

EXAMPLES 6–8

Using the general procedure of Example 1, the following compositions were prepared:

|  | Control B | Control C | 6 | 7 | 8 |
| --- | --- | --- | --- | --- | --- |
| Low density polyethylene (R9 LDPE) | 100 | 100 | 100 | 100 | 100 |
| Decabromobiphenyl ether | 40 | 35 | 35 | 30 | 25 |
| Antimony oxide | 20 | 18 | 18 | 15 | 13 |
| Zinc salt of 2-mercaptotolylimidazole | 8 | 8 | 8 | 8 | 8 |
| Tetrakis (methylene-3)(3',5'-4-di-tert-butyl-4'-hydroxyphenyl) propionate) methane (Irganox 1010) | 4 | 4 | 4 | 4 | 4 |
| Di-basic lead phthalate | — | — | 2 | 1.5 | 1.0 |
| Dimethylpolysiloxane gum (high molecular weight Silica reinforced gum) (CE 902 GE Co.) | 5 | 5 | 5 | 5 | 3 |
| Fumed colloidal silica (Cabosil MS-7) | 5 | 5 | 5 | 5 | 4.5 |
| Vul Cup R | 3 | 3 | 3 | 3 | 3 |

The above formulations were cured on #20 AWG tinned copper wire. The results of UL 62 flame testing was as follows:

| Control B | Control C | 6 | 7 | 8 |
| --- | --- | --- | --- | --- |
| fail (cotton ignited) | fail (cotton ignited) | pass | pass | pass |

The composition proportions are based on the ethylene polymer content being 100 parts by weight and each component being defined as parts by weight per hundred parts by weight of the ethylene polymer.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A curable, flame retardant insulating composition which consists essentially of:
   (a) an ethylene containing polymer;
   (b) ethylene-bis (tetrahalophthalimide;
   (c) an antimony compound
   (d) from 0.25 parts by weight to 2.5 parts by weight of lead compound per 100 parts by weight of ethylene containing polymer;
   (e) a combination of a sterically hindered phenol with at least one zinc salt of a mercaptoimidazole selected from the group consisting of a zinc salt of 2-mercapto-benzimidazole and a zinc salt of 2-mercaptotolyl-imidazole; and
   (f) a peroxide curing agent.

2. A curable, flame retardant insulating composition as defined in claim 1 wherein the ethylene containing polymers is selected from the group consisting of polyethylene; copolymers of ethylene and vinyl acetate; copolymers of ethylene and propylene; terpolymers of ethylene and propylene with a diene; and ethylene-acrylic copolymers.

3. A curable, flame retardant insulating composition as defined in claim 2 wherein the ethylene bis (tetrahalophthalimide) is ethylene bis(tetrabromophthalimide).

4. A curable, flame retardant insulating composition as defined in claim 2 or 3 wherein the antimony compound is an inorganic antimony compound.

5. A curable, flame retardant insulating composition as defined in claim 4 wherein the antimony compound is antimony oxide.

6. A curable, flame retardant insulating composition as defined in claim 2 or 3 wherein the lead compound is an organic lead compound.

7. A curable, flame retardant insulating composition as defined in claim 6 wherein the lead compound is dibasic lead phthalate.

8. A curable, flame retardant insulating composition as defined in claim 6 which includes an antioxidant agent.

9. A curable, flame retardant insulating composition as defined in claim 8 wherein the antioxidant agent is a combination of a sterically hindered phenol with at least one zinc salt of mercaptoimidazole selected from the group consisting of a zinc salt of 2-mercaptobenzimidazole and a zinc salt of 2-mercaptotolylimidazole.

10. A curable, non-dripping flame retardant composition as defined in claim 1 wherein the peroxide curing agent is dicumyl peroxide.

11. An electrical conductor bearing a layer of cured insulation composition of claim 1.

12. An electrical conductor bearing a layer of cured insulation as defined in claim 11 wherein the ethylene polymer is selected from the group consisting of polyethylene; copolymers of ethylene and vinyl acetate; copolymers of ethylene and propylene; and terpolymers of ethylene and propylene with a diene.

13. An electrical conductor bearing a layer of cured insulation as defined in claim 12 wherein the ethylene-bis(tetrahalophthalimide) is ethylene-bis(tetrabromophthalimide).

14. An electrical conductor bearing a layer of cured insulation as defined in claim 13 wherein the antimony compound is an inorganic antimony compound.

15. An electrical conductor bearing a layer of cured insulation as defined in claim 14 wherein the inorganic antimony compound is antimony oxide.

16. An electrical conductor bearing a layer of cured insulation as defined in claim 15 wherein the organic lead compound is dibasic lead phthalate.

17. An electrical conductor bearing a layer of cured insulation as defined in claim 16 wherein said layer of cured insulation includes an antioxidant.

18. An electrical conductor bearing a layer of cured insulation as defined in claim 17 wherein the antioxidant agent is a combination of a sterically hindered phenol with at least one zinc salt of mercaptoimidazole selected from the group consisting of a zinc salt of 2-mercaptobenzimidazole and a zinc salt of 2-mercaptotolylimidazole.

19. A curable, flame retardant insulating composition which consists essentially of

|     |     | PHR |
| --- | --- | --- |
| (a) | low density polyethylene and low molecular weight polyethylene 90:10; | 100 |
| (b) | ethylene bis(tetrabromophthalimide; | 30 |
| (c) | antimony oxide; | 15 |
| (d) | di-basic lead phthalate; | 1.5 |
| (e) | fumed colloidal silica; | 5 |
| (f) | tetrakis (methylene-3(3',5'-di-tert-butyl-4'-hydroxyphenyl) propionate) | 4 |
| (g) | zinc salt of 2-mercaptotolylimidazole; | 8 |
| (h) | dimethylpolysiloxane gum; | 5 |
| (i) | trimethylol propane trimethacrylate; and | 1 |
| (j) | p and m-isomers of bis-tert-butyl peroxy) diisopropyl benzene | 3. |

* * * * *